(Model.)
J. N. SHEFFIELD.
BEEHIVE.
No. 525,747. Patented Sept. 11, 1894.
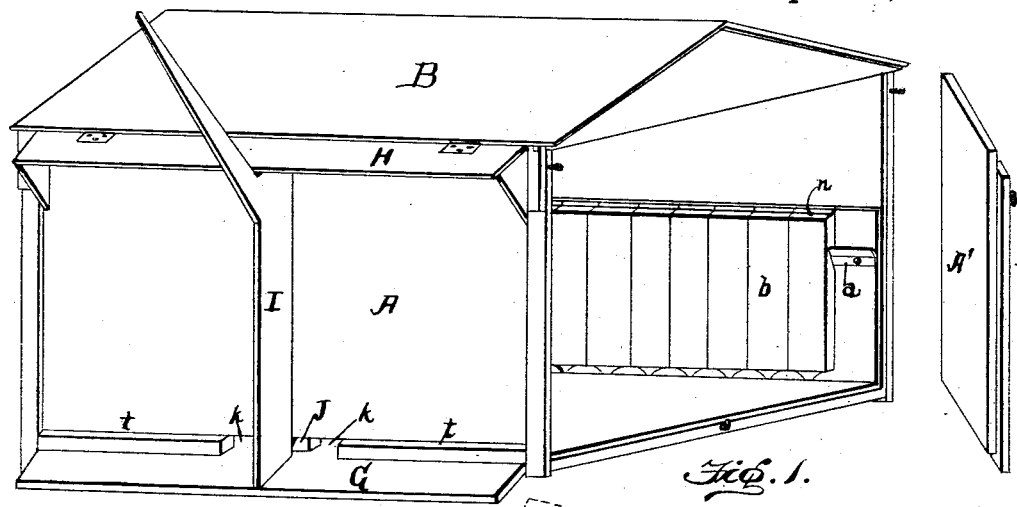
Fig. 1.
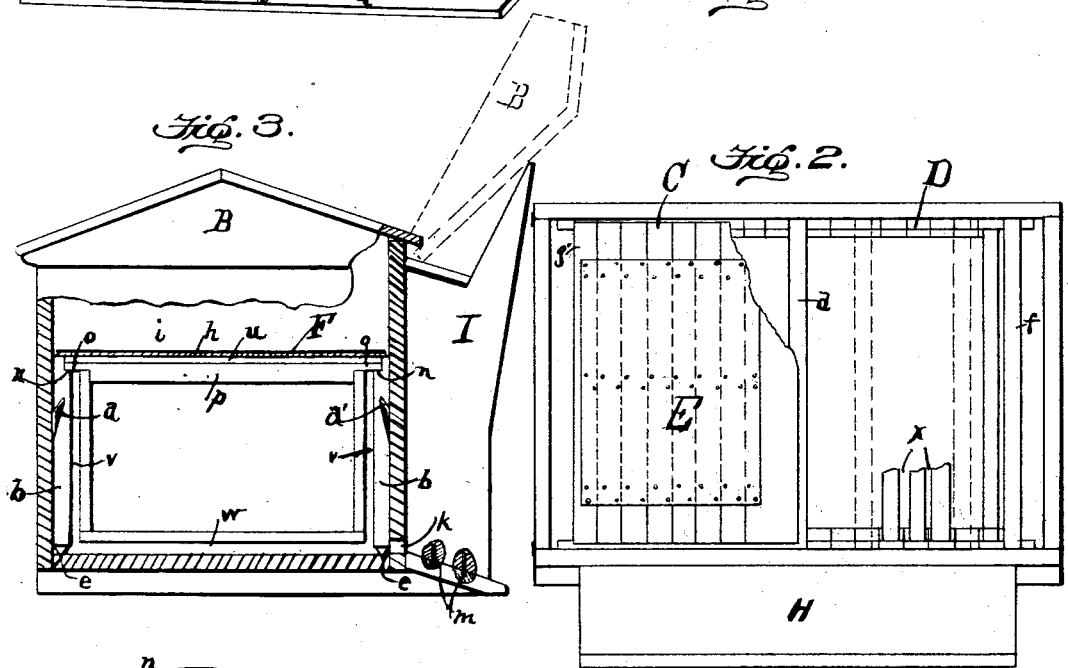
Fig. 3. Fig. 2.
Fig. 4. Fig. 6.
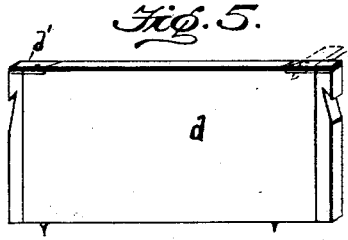
Fig. 5.
Witnesses:
Wm. H. Edwards.
Wm. N. Bates.
J. N. Sheffield,
Inventor.
By—
C. B. Whitmore,
Attorney.
THE NORRIS PETERS CO., PHOTO-LITHO., WASHINGTON, D. C.

UNITED STATES PATENT OFFICE.

JULIAN N. SHEFFIELD, OF MANCHESTER, NEW YORK.

BEEHIVE.

SPECIFICATION forming part of Letters Patent No. 525,747, dated September 11, 1894.

Application filed November 28, 1892. Serial No. 453,447. (Model.)

*To all whom it may concern:*

Be it known that I, JULIAN N. SHEFFIELD, of Manchester, in the county of Ontario and State of New York, have invented a new and useful Improvement in Beehives, which improvement is fully set forth in the following specification and shown in the accompanying drawings.

My invention relates to hives for bees designed both for the purpose of producing honey and for breeding, the same being hereinafter fully described and more particularly pointed out in the claims.

Referring to the drawings Figure 1 is a perspective view of my improved hive with one end removed and standing at a slight distance therefrom to show the interior of the hive. Fig. 2 is a broken top plan view with the cover removed. Fig. 3 is a broken transverse sectional view, and Figs. 4, 5, and 6 are detail views.

Referring to the parts shown, A, is a box or hive forming an inclosure for the bees, preferably made rectangular in form, with a V-roof or cover, B, hinged to A. The interior of the hive is formed or provided with two horizontal strips $a\ a'$, secured rigidly at opposite sides thereof. These strips serve to hold numerous vertical rests, $b$, for brood frames. These rests $b$ are uniform in size and are preferably about one inch thick and one and one-half inches wide, placed or hung edge to edge upon the respective strips, with their flat sides turned inward. In length the rests may be twelve or more inches; and their length determines the vertical depth of the compartments occupied by the bees. These rests do not extend to the floor, their lower ends being separated therefrom and each is provided with a vertical pin, $e$, extending downward to pierce the floor, as clearly shown in Fig. 3. These pins serve to stay the lower ends of the rests and hold them in position.

The interior of the hive is divided transversely by a center board, $d$, and end boards, $f$ and $g$, all three of which, like the rests $b$, being formed to fit and hang upon the strips $a\ a'$. These transverse boards constitute partitions for the brood chambers, C D, and they may be moved laterally along the ledges to increase or decrease the size of these chambers as necessity may require. When these boards are shifted they displace some of the rests $b$, which have to be rearranged accordingly, the latter being placed to fill the space at the sides between adjacent boards. The upper edges of the dividing boards are even with the upper ends of the rests $b$, and may be provided with pivoted latches $d'$, for securing them in position. The boards extend to the floor, their lower edges being preferably provided with pins similar to those referred to by $e$, to pierce the floor.

The rests $b$ are formed with notches or recesses, $n$, Figs. 1, 3, and 4, at their upper ends for receiving brood frames, $p$, Fig. 3, the frames having projecting parts, $o\ o$, to rest in said notches. These brood frames are simple rectangular frames, each formed of four strips of wood. Bee spaces, $v\ v$, are left at the sides of the frames, and also below the frames, at $w$. The frames are narrower or thinner than the rests $b$, as shown in Fig. 2. Bee spaces, $x$, are also formed between adjacent frames. Further, the upper edges of the frames being below the ends of the rests $b$, bee spaces, $u$, are formed above the frames.

The brood chambers C D are provided with flexible covers or honey boards, E F, formed of transverse strips, $h$, held together by some flexible material as sheets of canvas, $i\ i$, tacked or otherwise secured to them. By means of their flexible nature the honey boards may be rolled or folded to cover narrower widths as the chambers are decreased in size.

The front of the hive is provided with an inclined sill, G, Figs. 1 and 3, even with the floor, and an awning, H. Even with the floor a horizontal entrance opening, $k$, is formed through the wall of the hive through which the bees may pass back and forth. This opening extends laterally both ways to communicate with the chambers C D, whether made large or small by shifting the center board $d$.

A vertical guide board, I, is employed outside the hive, at right angles with the wall of the latter, having its inner edge contiguous to the hive, to guide the incoming bees into their proper chambers. This guide board rests at its lower end upon the sill G, Figs. 1 and 3, and at its upper end it rests against the under surface of the awning. Its lower end may be held to place by a pin, $m$, pressed into the sill, or by some other equally simple means. It is arranged to have this guide board shiftable laterally to occupy different positions, as indicated by dotted lines in Fig. 2. The guide board is shifted one way or the other accordingly as the center board $d$ is shifted to increase or decrease either of the chambers C, D. For instance, a bee leaving the hive through the opening $k$ on either side of the guide board will, upon returning to the hive, enter the latter upon the same side of the guide board to whatever position the latter may be shifted.

When there are two independent colonies of bees of about equal strength in the hive, or when a single colony is to be divided, with a queen bee for each colony, I usually place the center board $d$ and the guide board I at the middle; but when two colonies are of unequal strength, or when a colony in one chamber manifests a disposition to swarm and I wish to delay or prevent the swarming, or when I wish to divide the young bees from the honey makers, or to accomplish other results, I change the center board and the guide board to the right or left as the case may be. I do not, however, usually make provision for shifting the guide board to as many positions as the center board may be shifted to, the latter being capable of being shifted to occupy the space of any two opposite frame rests $b$ as will be understood by viewing Fig. 1. I usually arrange for only three positions of the guide board, as shown in Fig. 2. This guide board I also extend upward to form a rest for the cover B of the hive, when swung open, as indicated by dotted lines in Fig. 3.

In addition to the guide board I, to divide the entrance opening $k$, I also employ a guide block $t$, to modify said entrance opening. This consists of a block made of any suitable width, and rests upon the floor of the hive. At its front it is provided with a shoulder which rests against the wall of the hive, the smaller portion of the block produced by this shoulder extending beneath the wall and projecting slightly beyond the same. This block can be moved laterally, and with the guide I, serves to form a passage along which the bees will be directed to one or the other of the chambers C and D.

When the center board and guide board are at the middle of the house a simple block or plug J is inserted in the entrance opening to fill the latter between said center board and guide board. This effectually divides the bees and prevents them from entering the wrong chamber so long as they pass in on the proper side of the guide board. This block or plug is used in no other case.

Access to the interior of a hive may be had by lifting out the frames in the ordinary manner, or one or both ends A' may be removed or taken off as shown in Fig. 1.

The honey cases for receiving the surplus honey may be placed in the space over the chambers in the usual manner, the honey board or boards, as the case may be, being first removed from over the brood frames and placed on top of the honey cases.

Providing the hive with multiple or "union brood chambers" C D enables me to arrange and proportion the broods and honey so as to successfully winter the bees through, and bring up weak broods to the proper strength to commence work when the honey season begins; while at the same time two strong broods can work independently of each other in these combined chambers as well as in separate hives.

What I claim as my invention is—

1. A bee-hive consisting of a box or hive having within a shiftable cross partition or center board, and movable rests and brood frames fitting upon said rests, one of the walls of the hive being provided with a horizontal entrance opening extending laterally each side of said center board, in combination with external shiftable dividers for the entrance opening, substantially as shown and described.

2. A bee-hive consisting of a box or hive provided with internal opposing horizontal ledges, in combination with brood frames, and rests for the brood frames formed to fit and rest upon said ledges, and shiftable cross partitions formed to fit said ledges, substantially as shown and described.

3. A bee-hive consisting of a box or hive provided with internal opposing horizontal ledges, in combination with brood frames, and rests for the brood frames formed to fit and rest upon said ledges, and cross partitions forming brood chambers, formed to fit said ledges, and flexible covers for the brood chambers, substantially as shown.

4. A bee-hive consisting of a box or hive provided with internal opposing horizontal ledges, in combination with brood frames, and and rests therefor formed to fit and rest upon said ledges, said rests being notched at their upper ends and the brood frames having projecting parts at their upper sides to rest in said notches, and covers for the brood frames above said rests $b$, with bee spaces between said brood frames and said covers, substantially as shown and described.

5. A bee-hive consisting of a box or hive provided with a shiftable cross partition or center board within, one of the walls of the hive having formed therein an opening for the bees, and a sill below the entrance opening, in combination with an external shiftable guide board serving to divide the entrance opening, substantially as shown and described.

6. A bee-hive consisting of a box or hive provided with an interior shiftable cross partition or center board, an entrance opening for the bees, and a sill adjacent to the entrance opening, in combination with a shiftable guide board serving to divide the entrance opening, and a movable guide block, substantially as and for the purpose specified.

7. A bee-hive consisting of a box or hive provided with internal horizontal ledges at its opposite sides having inclined upper edges, in combination with brood frames, and vertical rests $b$, for the brood frames cut out at their rear sides and formed with shoulders to fit the inclined edges of the ledges, the parts $b$ being provided with pins to pierce the floor of the house, substantially as shown and described.

JULIAN N. SHEFFIELD.

Witnesses:
CHAS. G. McLOUTH,
GREENWAY NICHOLS.